(12) United States Patent
Backes

(10) Patent No.: US 9,692,285 B2
(45) Date of Patent: Jun. 27, 2017

(54) ELECTRODYNAMIC ACTUATOR

(75) Inventor: Ulrich Backes, Radolfzell (DE)

(73) Assignee: TRW Automotive Electronics & Components GmbH (DE)

( * ) Notice: Subject to any disclaimer, the term of this patent is extended or adjusted under 35 U.S.C. 154(b) by 692 days.

(21) Appl. No.: 13/822,369

(22) PCT Filed: Sep. 15, 2011

(86) PCT No.: PCT/EP2011/066020
§ 371 (c)(1),
(2), (4) Date: May 16, 2013

(87) PCT Pub. No.: WO2012/035106
PCT Pub. Date: Mar. 22, 2012

(65) Prior Publication Data
US 2013/0249323 A1    Sep. 26, 2013

(30) Foreign Application Priority Data
Sep. 15, 2010  (DE) .................. 10 2010 045 536

(51) Int. Cl.
| | |
|---|---|
| *H02K 33/18* | (2006.01) |
| *H01F 7/16* | (2006.01) |
| *H04R 9/04* | (2006.01) |
| *H01F 5/00* | (2006.01) |
| *H01F 7/06* | (2006.01) |

(52) U.S. Cl.
CPC .......... *H02K 33/18* (2013.01); *H01F 7/1646* (2013.01); *H04R 9/047* (2013.01); *H01F 5/00* (2013.01); *H01F 7/06* (2013.01); *H01F 2007/068* (2013.01)

(58) Field of Classification Search
CPC . H01F 2007/068; H01F 7/1646; H02K 33/18; H02K 3/26; H04R 9/047; H04R 9/00; H04R 7/00; H04R 7/04; H04R 7/02; H01R 9/047; G01L 9/0044; G01L 9/14
USPC ....... 310/12.16, 15; 381/404, 409, 410, 399, 381/176, 431; 335/205–207, 229–234, 335/299
See application file for complete search history.

(56) References Cited

U.S. PATENT DOCUMENTS

| | | | | |
|---|---|---|---|---|
| 3,141,071 | A * | 7/1964 | Rich ..................... | H04R 9/047 381/408 |
| 4,037,061 | A * | 7/1977 | von Recklinghausen .... | H04R 9/047 381/408 |
| 4,228,327 | A * | 10/1980 | Sawafuji ................ | H04R 9/047 381/398 |
| 4,236,137 | A * | 11/1980 | Kurtz .................... | G01L 9/0054 257/419 |
| 4,264,789 | A * | 4/1981 | Kaizu .................... | H04R 9/02 381/408 |
| 4,471,172 | A * | 9/1984 | Winey ................... | H04R 9/047 381/412 |

(Continued)

FOREIGN PATENT DOCUMENTS

| | | |
|---|---|---|
| EP | 1079379 | 2/2001 |
| EP | 1367854 | 12/2003 |

(Continued)

*Primary Examiner* — Burton Mullins
(74) *Attorney, Agent, or Firm* — Tarolli, Sundheim, Covell & Tummino LLP

(57) ABSTRACT

An electrodynamic actuator (10), has a flat coil (24) formed by tracks (22, 23) on a face of a circuit board (16) and a permanent magnet (14) the magnetic field of which passes through turns of the flat coil (24).

19 Claims, 1 Drawing Sheet

(56) References Cited

U.S. PATENT DOCUMENTS

| | | | | |
|---|---|---|---|---|
| 4,905,575 | A * | 3/1990 | Knecht | G01L 9/0042 338/4 |
| 5,008,496 | A * | 4/1991 | Schmidt et al. | 174/254 |
| 5,039,895 | A * | 8/1991 | Meister | G04C 13/11 310/184 |
| 5,064,165 | A * | 11/1991 | Jerman | G01L 9/0073 251/368 |
| 5,905,805 | A * | 5/1999 | Hansen | H04R 9/06 381/398 |
| 5,959,522 | A * | 9/1999 | Andrews | H01F 7/08 336/200 |
| 6,369,400 | B1 * | 4/2002 | Haeberle | B82Y 15/00 250/548 |
| 6,388,789 | B1 * | 5/2002 | Bernstein | B81B 3/0021 359/198.1 |
| 6,480,614 | B1 * | 11/2002 | Denda | H04R 9/047 381/191 |
| 6,593,847 | B2 * | 7/2003 | Miyazaki | H04R 7/04 336/232 |
| 6,600,399 | B1 | 7/2003 | Trandafir | |
| 7,174,024 | B1 * | 2/2007 | Suzuki | H04R 7/04 381/152 |
| 7,230,743 | B2 * | 6/2007 | Matsuo | G02B 26/085 359/200.7 |
| 7,256,926 | B2 * | 8/2007 | Kamiya | G02B 26/085 359/224.1 |
| 7,557,470 | B2 * | 7/2009 | Culpepper et al. | 310/15 |
| 7,912,239 | B2 * | 3/2011 | Nishimura | H04R 9/06 381/396 |
| 8,500,938 | B2 * | 8/2013 | Stahr et al. | 156/256 |
| 2004/0136558 | A1 * | 7/2004 | Usuki | H04R 9/025 381/394 |
| 2006/0291688 | A1 | 12/2006 | Nishimura et al. | |
| 2007/0098207 | A1 * | 5/2007 | Lin | H04R 7/06 381/399 |
| 2008/0296984 | A1 * | 12/2008 | Honma et al. | 310/17 |
| 2009/0317853 | A1 * | 12/2009 | Dambrowsky et al. | 435/29 |
| 2010/0260371 | A1 * | 10/2010 | Afshar | 381/394 |
| 2011/0044476 | A1 * | 2/2011 | Burlingame et al. | 381/121 |

FOREIGN PATENT DOCUMENTS

| | | | |
|---|---|---|---|
| EP | 1489881 | 12/2004 | |
| JP | 55-148293 | 10/1980 | |
| JP | 56076700 | 6/1981 | |
| JP | 200152371 | 2/2001 | |
| JP | 2002218592 | 8/2002 | |
| JP | 2003236467 | 8/2003 | |
| JP | 2005517306 | 6/2005 | |
| JP | EP 1845750 A1 * | 10/2007 | H04R 7/18 |
| JP | 2008167475 | 7/2008 | |
| WO | 2006/123263 | 11/2006 | |

\* cited by examiner

ELECTRODYNAMIC ACTUATOR

RELATED APPLICATIONS

This application corresponds to PCT/EP2011/066020, filed Sep. 15, 2011, which claims the benefit of German Application No. 10 2010 045 536.9, filed Sep. 15, 2010, the subject matter, of which are incorporated herein by reference in their entirety.

BACKGROUND OF THE INVENTION

The invention relates to an electrodynamic actuator.

Electrodynamic actuators are for example known as moving coils which are used as sound transducers in electrodynamic loudspeakers, for example. An electric current flows through a cylindrical coil in a magnetic field of a permanent magnet and generates a force onto the coil device which is oriented perpendicularly to the current direction and to the magnetic field. However, such a moving coil requires a relatively complex mounting of the coil and a corresponding space.

SUMMARY OF THE INVENTION

The object of the invention is to provide an electrodynamic actuator having a simple and compact design.

This object is achieved by an electrodynamic actuator according to the invention, which has a flat coil formed by tracks on a face of a circuit board and a permanent magnet the magnetic field of which passes through turns of the flat coil. The configuration of the coil as a flat coil by tracks formed on the circuit board permits a compact and particularly flat configuration of the actuator and a simple design of the flat coil.

Advantageous further developments are specified in the dependent claims.

BRIEF DESCRIPTION OF THE DRAWINGS

Further advantages and features of the invention will become apparent from the description below with reference to the accompanying drawings which show.

DESCRIPTION OF EXEMPLARY EMBODIMENT

Figure 1:
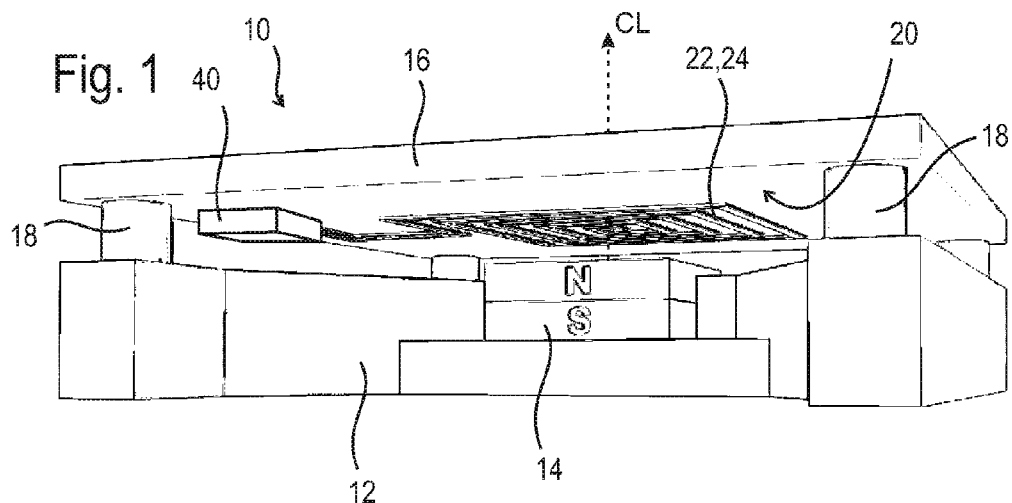
FIG. 1 an electrodynamic actuator according to the invention.

FIG. 1 shows an electrodynamic actuator 10. A support 12 is configured so as to receive a permanent magnet 14. The support 12 is furthermore connected to a circuit board 16, the circuit board 16 being spaced apart from the support 12 and from the permanent magnet 14 in a central region.

Four spacers 18 are provided on the support 12, which define a predetermined distance between the circuit board 16 and the support 12 and the permanent magnet 14.

Tracks 22, 23 which are arranged in a spiral manner and form a flat coil 24 are provided on the bottom side 20 of the circuit board 16 which is oriented towards the support 12. The magnetic field of the permanent magnet 14 passes through the turns of the flat coil 24.

In the embodiment shown, the permanent magnet 14 has its north pole oriented towards the circuit board 16 and is thus arranged coaxially to the flat coil 24. The pole of the permanent magnet 14 is arranged at a small distance from the circuit board 16 closely adjacent to the center of the flat coil 24.

In the embodiment shown, the extension of the permanent magnet 14 in the plane of the circuit board 16 is smaller than the extension of the flat coil 24. The diameter of the flat coil 24 is significantly larger than the diameter of the opposite face of the permanent magnet 14.

The circuit board 16 along with the flat coil 24 is described below with reference to FIGS. 2 and 3.

Figure 2:
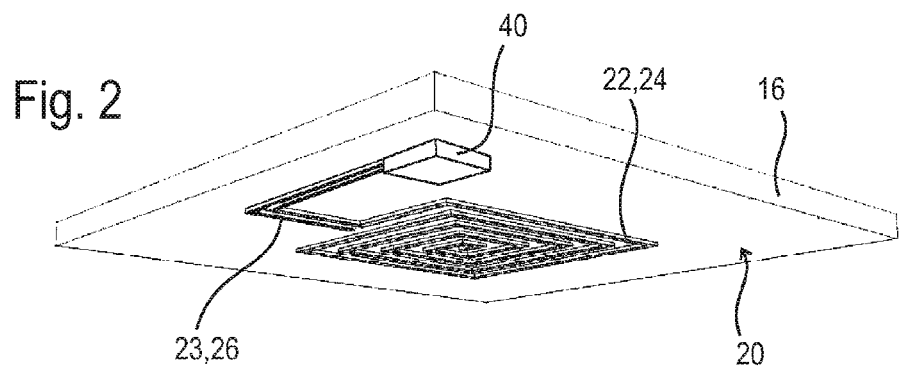
FIG. 2—the bottom side of the circuit board of the electrodynamic actuator according to FIG. 1.

FIG. 2 shows the bottom side 20 of the circuit board 16 with a first spiral track 22 which forms the flat coil 24. A second track 23 forms part of a return line 26. The return line 26 connects the center of the flat coil 24 to a terminal at the outer radius of the flat coil 24.

In the embodiment shown, the flat coil 24 is configured in a quadrangular manner. It is however possible to provide a circular flat coil or another design.

Figure 3:
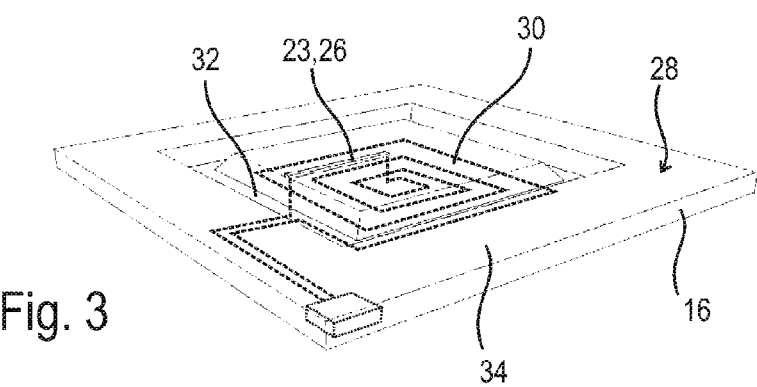
FIG. 3—the upper side of the circuit board of the electrodynamic actuator according to FIG. 1.

FIG. 3 shows the upper side 28 of the circuit board 16 which faces away from the support 12 and from the permanent magnet 14. The upper side 28 of the circuit board 16 is divided up into three regions 30, 32, 34. A central region 30 corresponds to the face of the circuit board 16 on which the flat coil 24 is located on the bottom side 20 of the circuit board 16. A track 23 forming part of the return line 26 is provided in the central region 30.

The central region 30 is separated from the surrounding region 34 of the circuit board 16 by a thinned region 32.

The surrounding region 34 of the circuit board 16 is rigidly connected to the support 12. The thinned region 32 is formed by milling of the circuit board 16 for example, or is molded into a circuit board 16 manufactured by injection molding.

The thinned region 32 is configured such that a deformation of the circuit board 16 is permitted in the thinned region 32. In this way, a movement of the central region 30 with respect to the surrounding region 34 in a direction perpendicular to the plane of the circuit board 16 is permitted.

It is alternatively also possible, that instead of the thinned region 34, a region is provided in which the circuit board 16 is completely divided so that the central region 30 is connected to the surrounding region 34 merely by webs configured in a flexible manner. An electric connection of the flat coil 24 can be realized by such a web, for example.

In the embodiment shown, the tracks are manufactured by MID (molded interconnect device) technology.

The flat coil 24 is connected to electronic components of a control unit 40 arranged on the circuit board 16. The electronic components of the control unit 40 are not illustrated in the Figures for reasons of clarity.

The actuator 10 is for example used as a drive of an acoustic transducer or as a drive of a haptic transducer in an input system.

In the embodiment shown, the permanent magnet 14 is arranged coaxially to the flat coil 24. The flat coil 24 is arranged in the inhomogeneous magnetic field at a small distance from the pole of the permanent magnet 14.

When current is guided through the flat coil 24, the flat coil 24 then generates a strong magnetic field in the center of the flat coil 24 which is oriented parallel or opposite to the magnetic field of the permanent magnet 14 depending on the current direction. As the inhomogeneous magnetic field of the permanent magnet 14 is weaker in the peripheral region of the flat coil 24 and/or has a different direction than in the center of the flat coil 24, a force is generated which in the central region 30 of the circuit board 16 urges in the axial direction towards the permanent magnet 14 or away from the permanent magnet 14, respectively.

As the circuit board 16 is configured so as to be flexible in the thinned region 32, the central region of the circuit board 16 is moved in the axial direction depending on the direction of the current flow through the flat coil 24.

The invention claimed is:

1. An electrodynamic actuator for an acoustic and/or haptic transducer, having a flat coil formed by tracks on a first face of a circuit board and a permanent magnet arranged adjacent to the first face the magnetic field of which passes through turns of the flat coil, a central region of the circuit board on which the flat coil is arranged being separated from the surrounding region of the circuit board by a thinned region comprising an at least partly circumferential recess in a second face of the circuit board, wherein the central region and the surrounding region are integrally formed from the same material, and wherein a thickness of the central region and a thickness of the surrounding region are each greater than a thickness of the thinned region.

2. The actuator according to claim 1, wherein the surrounding region of the circuit board is rigidly connected to a support of the permanent magnet.

3. The actuator according to claim 1, wherein the thinned region is formed by milling.

4. The actuator according to claim 1, wherein the thinned region is molded into a circuit board manufactured by injection molding.

5. The actuator according to claim 4, wherein the tracks are manufactured by MID technology.

6. The actuator according to claim 1, wherein the permanent magnet is arranged coaxially to the flat coil so as to have one of its poles closely adjacent to the center of the flat coil.

7. The actuator according to claim 1, wherein the flat coil is connected to electronic components of a pilot unit which are arranged on the circuit board.

8. The actuator of claim 1, wherein the face of the circuit board on which the flat coil is arranged is coplanar with the surrounding region of the circuit board prior to current being applied to the flat coil.

9. The actuator of claim 1, wherein the thinned region of the circuit board has a first thickness that is less than a second thickness of the surrounding region of the circuit board and less than a third thickness of a central region of the circuit board on which the flat coil is arranged, wherein the second thickness is equal to the third thickness.

10. The actuator of claim 1, wherein tracks forming parts of a return line connecting the flat coil with the control unit are provided on the second face of the circuit board in the central region and on the first face of the circuit board in the thinned region and in the surrounding region.

11. The actuator of claim 1, wherein the central region and the surrounding region have the same thickness.

12. The actuator of claim 1, wherein the thinned region is planar.

13. An electrodynamic actuator for an acoustic and/or haptic transducer, comprising:
    a permanent magnet having a magnetic field;
    a circuit board supported in alignment with the permanent magnet along a centerline and including first and second faces, the circuit board having a surrounding region extending around the central region, and a thinned region connecting the central region to the surrounding region, the thinned region having a first thickness along the centerline permitting relative movement between the central region and the surrounding region; and
    a flat coil on the central region of the circuit board and arranged on the first face of the circuit board, the magnetic field of the permanent magnet passing through the flat coil, the central region being movable relative to the surrounding region when current is applied to the flat coil,
    wherein the central region and the surrounding region are integrally formed from the same material,
    wherein the permanent magnet is arranged adjacent to the first face of the circuit board and the thinned region comprises an at least partially circumferential recess in the second face of the circuit board; and
    wherein the central region has a second thickness and the surrounding region has a third thickness which are each greater than the first thickness of the thinned region.

14. The actuator of claim 13, wherein the central region is movable toward the permanent magnet relative to the surrounding region.

15. The actuator of claim 13, wherein the flat coil is provided on a face of the central region that is coplanar with the surrounding region of the circuit board prior to current being applied to the flat coil.

16. The actuator of claim 13, wherein the second thickness of the central region and the third thickness of the surrounding region are the same.

17. The actuator of claim 13, wherein the thinned region is a milled region.

18. The actuator of claim 13, wherein the flat coil is connected to electronic components of a control unit which are arranged on the circuit board.

19. The actuator of claim 13, wherein the central region and the surrounding region have the same thickness and the thinned region is planar.

* * * * *